Feb. 13, 1934.        M. E. JOHNSON        1,946,696
COMBINED NOZZLE AND SPRAYING DEVICE
Filed Aug. 21, 1931
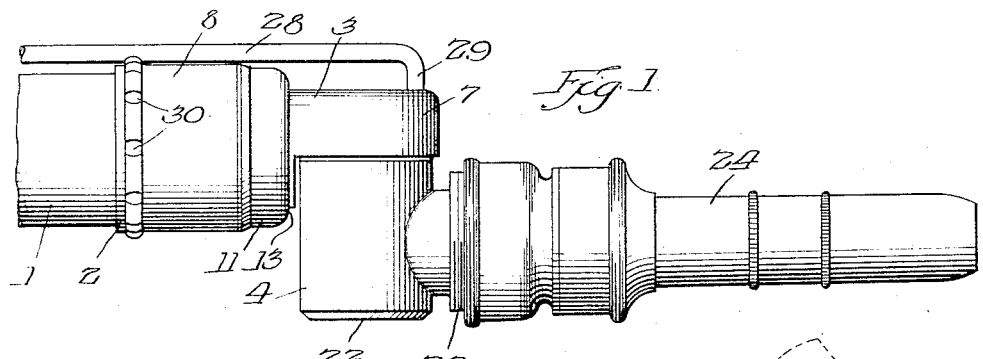
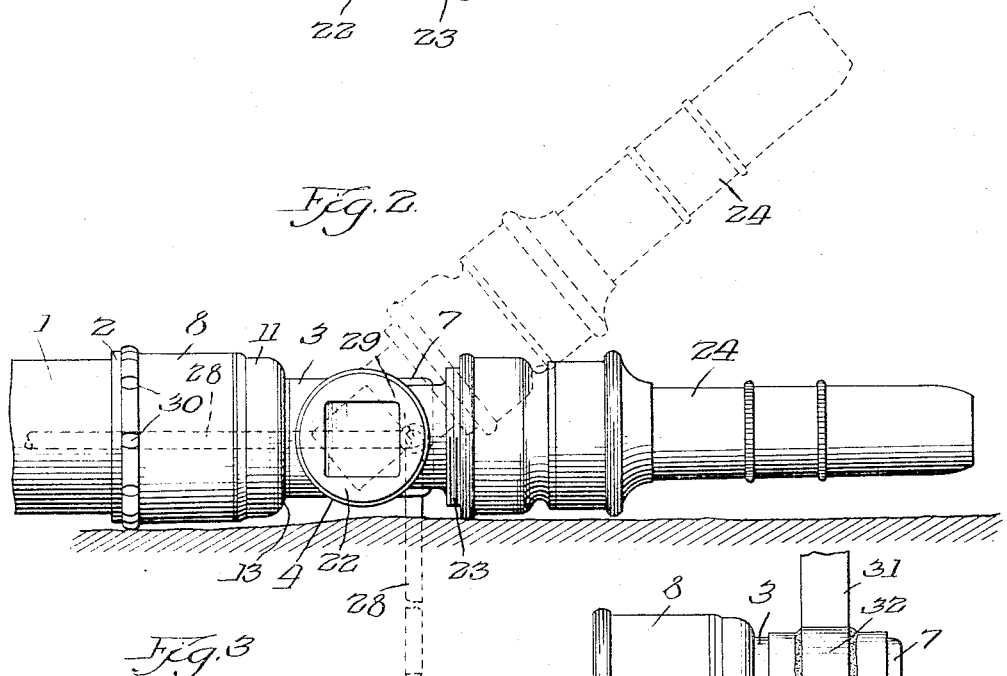
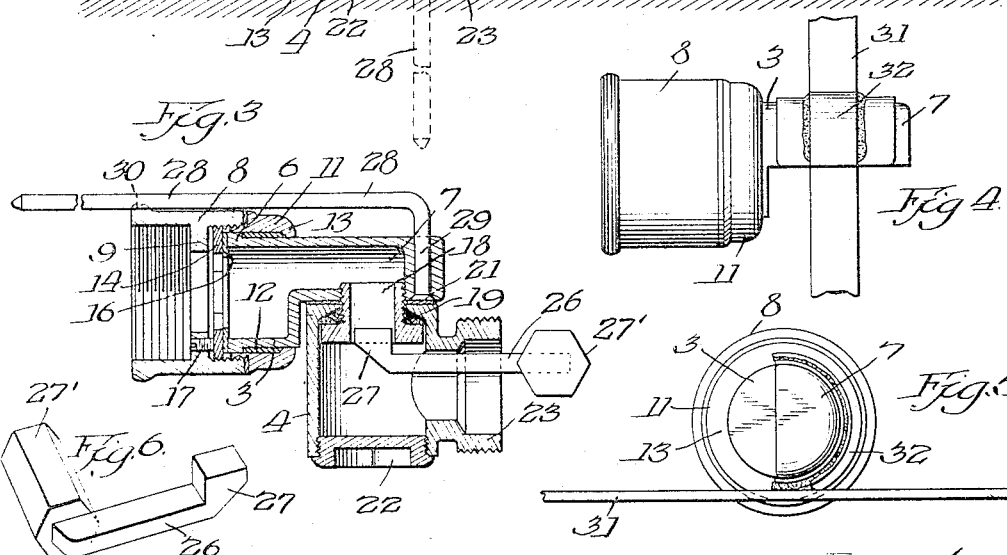
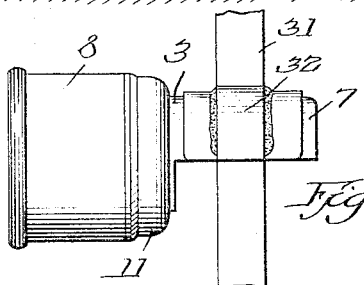
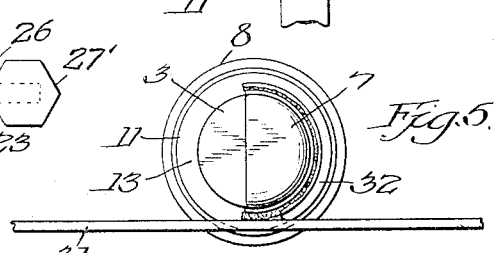
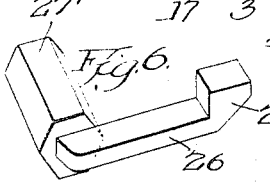
Inventor:
Martin E. Johnson
By Wilson, Dowell, McCanna & Rehm
Attys Patented Feb. 13, 1934

1,946,696

UNITED STATES PATENT OFFICE 1,946,696

COMBINED NOZZLE AND SPRAYING DEVICE

Martin E. Johnson, Chicago, Ill.

Application August 21, 1931. Serial No. 558,459

1 Claim. (Cl. 285—9)

This invention pertains generally to watering devices for watering lawns, shrubs, and the like, and aims to combine in a single apparatus all of the functions and advantages of an ordinary nozzle such as is customarily manually held and manipulated; and also the functions and advantages of a spraying device such as is ordinarily substituted at the end of a hose for the hand nozzle and placed on the ground when it is desired to direct a continuous spray over a given locality.

The primary purpose of my invention is to provide a swiveled hose nozzle coupling which will obviate the expense of purchasing both a nozzle and spraying device and the annoyance of alternately connecting and disconnecting the same to and from the hose when the different functions are required. This desirable end is accomplished by combining the functions of the heretofore structurally independent nozzle and spraying device into one apparatus which can remain permanently attached to the end of the hose and can be used either as an ordinary hand nozzle or as a fixed spraying device.

One of the particular features of my invention resides in the adjustability of my improved device which through its flexible connections is capable of adjustment to any desired angle and is not likely to become dislodged or out of adjustment through whipping or turning of the hose.

Other features of the invention reside in the provision of a device which can be economically manufactured, which will require a minimum of space for shipment, which can be easily and readily adjusted, which will not leak or get out of order, which may be tightened without dismantling or disassembling, and which will be effective and durable in operation. Still other objects and advantages of this invention will be appreciated as the same becomes better understood by reference to the following description when considered in connection with the accompanying drawing, in which Figure 1 is a plan view of a swiveled hose nozzle coupling embodying the features of this invention illustrating its use as a hand device;

Figure 2 is a side elevation of the same, illustrating the hose nozzle supported upon the ground for use as a fixed spray device and showing the nozzle in two possible positions;

Figure 3 is a transverse section through the center of the coupling device, omitting the hose and nozzle and illustrating one method of tightening the swivel connection;

Figure 4 is a plan elevation of the body of the coupling illustrating an alternate form of supporting the same upon the ground for use as a fixed spray device;

Figure 5 is an end elevation of the form shown in Figure 4; and

Figure 6 is a perspective of a tool by means of which the swivel connection may be tightened without disassembling the coupling.

Referring to the drawing more in detail reference character 1 indicates generally a portion of a garden hose equipped at its ends with the customary male coupling member 2 externally threaded for attachment to a nozzle or spraying device and in the present instance to the coupling device.

The flexible coupling comprises generally a body 3 and a head 4 pivotally connected to the body. The body, as will be apparent from Figure 3, comprises a suitably shaped hollow member provided at one end with an annular flange or shoulder 6 and terminating at its other end in a semi-cylindrical end portion 7 to the flat surface of which is pivotally connected the head 4 as will be hereinafter described.

A coupling member or sleeve is rotatably secured to the flanged end of the body for attaching the body to a hose and comprises a sleeve 8 threaded internally at one end to constitute a female coupling adapted to receive the male coupling member 2 on the hose. Intermediate its ends the sleeve is provided with an internal partition 9 bored centrally to permit flow therethrough. The other end of the sleeve is chambered and threaded internally to engage a nut 11 chambered to receive packing 12 and provided with an inturned flange 13 of proper diameter to snugly fit the body member and engage shoulder 6. As the nut 11 is screwed into sleeve 8 shoulder 6 and packing 12 will be clamped between the two members in such a manner as to permit rotation of the body within the sleeve and yet prevent any leakage. To maintain the packing under compression at all times an adjustable washer 14 is threaded into the end of sleeve 8 between partition 9 and shoulder 6. Between this latter washer and shoulder 6 is also placed a spring washer 16. The washer 14 is preferably provided with a hexagonal opening therethrough to receive a wrench and may be locked in adjusted position through the medium of a small set screw 17.

Pivotally secured to the flat surface of the semi-cylindrical portion of the body is the hollow head 4. The body and head members are pivotally and frictionally secured together by means of a hollow pivot screw 18 which passes through the head and is threaded into the flat wall of the semi-cylindrical portion of the body. Between the contacting flat wall of the head member and the head of the screw 18 is placed some packing 19 which is maintained under compression by a spring washer 21 inserted between the contacting surfaces of the body and head. This construction provides that the pressure of the fluid passing through the coupling tends to compress both packings 12 and 19. In other words, the line pressure tends to tighten these two joints rather than cause leakage therebetween. For convenience in manufacture and removal of screw 18 the outer end of the hollow head 4 is provided with a removable cap 22. The terminating end 23 of the head member is threaded externally to receive any suitable nozzle 24.

In order that screw 18 may be tightened without disassembling the coupling, a special tool (Figure 6) is provided having a handle or shank 26 and a square offset head 27 upon one end and a hexagonal head 27' upon the other end. The hexagonal head 27' may be readily engaged with washer 14 to adjust the same and the tool may be inserted through the open end 23 of the head and caused to engage screw 18 which for this purpose is provided with a square bore. It is only necessary therefore to insert the tool into the end 23 of the head, engage screw 18 and rotate the head relatively to the body to cause a tightening of screw 18.

As previously stated, the coupling is designed to be used as a hand nozzle or as a fixed spray. For the latter purpose an angular supporting pin 28 is provided and has its short end 29 riveted or otherwise secured to the body 3 as is clearly shown in Figure 3. For use as a support pin 28 may be swung about its pivoted end to a position at right angles to the body or line of hose and pushed into the ground to rigidly secure the coupling thereto as shown in Figure 2. For hand operation pin 28 may be rotated about its pivot and brought into alignment with the body and secured in this position by engagement with one of the several notches 30 provided in the terminating bead of the sleeve 8. The retracted position is shown in Figures 1 and 3.

Referring to Figures 4 and 5, there is illustrated a slightly different form of supporting stand. In this modification the supporting medium is entirely removable and comprises the bar 31 having intermediate its ends a semi-cylindrical arm 32 of proper size and diameter to frictionally engage the semi-cylindrical end 7 of the body. In this form of my invention the supporting means is adapted to be entirely removed when it is desired to use the coupling as a hand device and may be readily attached when it is desired to use the coupling as a fixed spray or sprinkler.

From the foregoing it will be apparent that my invention, through its two flexible joints which are self-tightening and one of which at least may be adjusted without disassembling the coupling, provides a medium which will combine the functions of a hand nozzle and fixed spray into one device. The full flexibility of the coupling assures complete range and insures against displacement of the spray due to whipping or other causes.

Many users of hose prefer not to employ a nozzle which seems to throttle the end of the hose and restrict flow therethrough, but prefer to remove the nozzle and use their thumb to break the force of the water without materially decreasing the flow and in that manner spray their lawn or garden. It has been found that applicant's swivel coupling appears to give the same effect without the operator using his thumb. That is, it is merely necessary to remove the nozzle and the coupling itself appears to break the flow of water sufficiently to eliminate the force without materially restricting the flow and furthermore gives quite a wide-spread shower or spray.

The principles of my invention and the preferred embodiment thereof should be understood from the foregoing without further description and it should also be manifest that the structural details are capable of considerable modification without departure from the essence of the invention as defined in the following claim.

I claim:

A swivel hose nozzle coupling comprising in combination, a body member adapted for connection to a hose, a delivery head member, and a pivotal frictional connection between said head and body permitting said head to be swung into various angular positions relatively to the body, said connection including a tubular projection on one of said members having an apertured end wall, a hollow screw having its head positioned in said projection and its shank extending through the aperture to be threaded into the remaining member, packing material disposed between the screw head and the end wall of said projection, and resilient means for placing said material under compression and for compensating for wear in said material.

MARTIN E. JOHNSON.